PUSH-PUSH SWITCH

Filed Dec. 11, 1959

INVENTOR.
HENRY M. DRESSEL
BY
Brown, Critchlow, Flick & Peckham
HIS ATTORNEYS 2,967,922
Patented Jan. 10, 1961

2,967,922

PUSH-PUSH SWITCH

Henry M. Dressel, St. Marys, Pa., assignor to Stackpole Carbon Company, St. Marys, Pa., a corporation of Pennsylvania Filed Dec. 11, 1959, Ser. No. 859,021

3 Claims. (Cl. 200—172)

This invention relates to electric snap switches, and more particularly to those in which an actuating shaft is moved axially in opposite directions to turn the switch off and on.

Push-pull electric switches are well known. In them, an actuating shaft is pushed in order to snap the switch in one direction, and is pulled to snap the switch in the opposite direction. Such switches are perfectly satisfactory where they are mounted on objects heavy enough to remain stationary when the switch shaft is pushed and pulled. However, if the switch is attached to a lightweight portable object and the switch shaft is pulled, the object is likely to be pulled from its support. Of course, it could also be pushed from its support when the shaft is pushed, but usually there is something behind the object to restrain it.

It is an object of this invention to provide an electric snap switch which can be snapped both on and off by pushing on an actuating member. Another object is to provide a simple manner of converting an ordinary push-pull switch into a push-push switch.

In accordance with this invention, the snap switch has a mounting bushing, tnrough which slidably extends an actuating shaft that is movable outward and inward to operate the switch. A knob is rigidly mounted on the outer end of the shaft for pushing it inward in the bushing. Loosely mounted on the shaft between the knob and bushing is a stiff disc that is located in close proximity with the knob and bushing when the knob is in its inner position. The disc projects radially beyond the knob to provide a marginal portion that is adapted to be pushed at any side of the shaft in order to tilt the disc against the adjoining end of the bushing and thereby cause the disc at the opposite side of the shaft to push the knob outward. A flexible disc may also be loosely mounted on the shaft between the knob and the stiff disc and project radially beyond the latter. The flexible disc can be pushed near one edge in the same way as the stiff disc and the action of the switch will be the same. In addition, the flexible disc can be pushed simultaneously at two diametrically opposite marginal points to cause it to flex inward over the outer edge of the stiff disc to thereby force the central portion of the flexible disc outward against the knob to push the knob outward.

The invention is illustrated in the accompanying drawings, in which.

Figure 1:
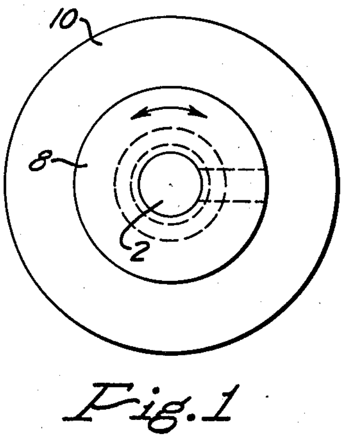
Fig. 1 is a view of the outer end of my assembly.
Figure 2:
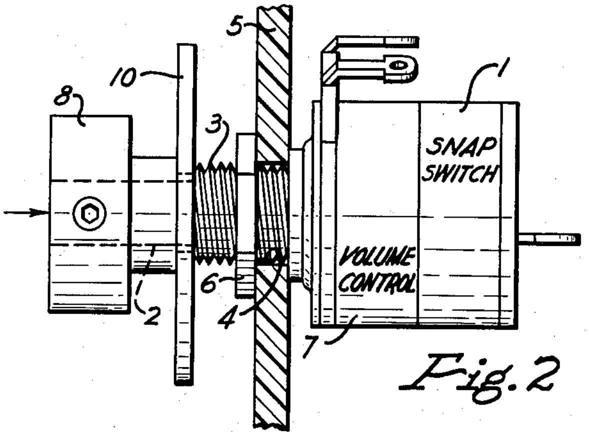
Fig. 2 is a side view of the assembly.
Figures 3, 4, 5:
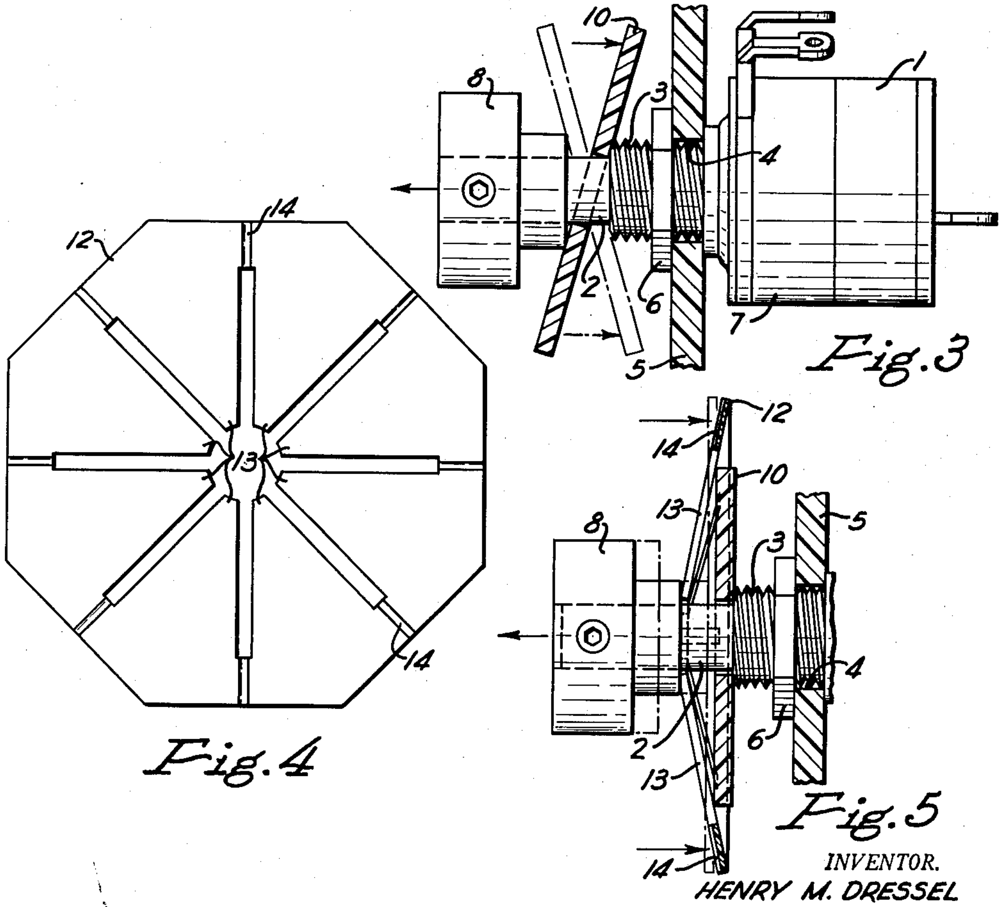
Fig. 3 is a similar view, with the stiff disc shown in section and tilted.
Fig. 4 is a front view of the flexible disc of the second embodiment of the invention.
Fig. 5 is a view similar to Fig. 3, but showing the flexible disc flexed.

Referring to Figs. 1 and 2 of the drawings, a snap switch 1 of any well-known construction that can be operated by an axially reciprocated control shaft 2 has a threaded bushing 3 which slidingly receives the shaft and extends forward through a hole 4 in a panel 5 or other suitable support. The switch is clamped against the back of the panel by means of a nut 6 screwed on the bushing and engaging the front or outer surface of the panel. In most cases, the actuating shaft will extend through and be splined in a volume control unit 7 located between the switch and the panel in a conventional manner. Consequently, rotation of the shaft by a knob 8 clamped on its outer end will operate the volume control, and axial reciprocation of the shaft will operate the switch. It is a feature of this invention that the shaft can be moved lengthwise in either direction by a pushing movement of the finger toward the switch. Accordingly, there is disposed between the outer end of the threaded bushing and the inner end of the knob a rigid disc 10 that encircles the shaft. The opening through the disc is considerably larger than the shaft so that the disc can be tilted on the shaft as shown in Fig. 3. When the knob is in its inner position, in which the switch is either opened or closed, depending on how it is made, the disc engages, or nearly engages, the knob and the bushing. The knob can be moved from its outer to its inner position by simply pushing against its outer face with the finger, as indicated by the arrow in Fig. 2.

In order to move the shaft outward so as to open the switch if it had been closed or to close it if it had been open, the knob is not pulled as is customary, but the marginal portion of disc 10, which extends radially beyond the knob, is pushed in one spot toward the panel by a finger in order to cause the disc to tilt against the adjoining end of the bushing. As shown in Fig. 3, this tilting causes the disc at the opposite side of the shaft to push outward on the knob and thereby move the shaft to its outer position. It will be seen, therefore, that the switch is actuated in one direction by pushing in on the knob and is actuated in the opposite direction by pushing in on the disc at one side of the shaft. Consequently, no matter how light the object of which panel 5 forms a part, as long as that object cannot be moved backward, actuation of the switch in either direction will not disturb the object because the operator will always push backward toward the panel, not pull forward. This device is especially useful when mounted on top of a light weight object resting on a table for the operator will always push downward to trip the switch.

In the modification shown in Figs. 4 and 5, the same arrangement is used as just described, except that the knob 8 is moved out on shaft 2 a little farther away from the bushing 3, and a flexible disc 12 of larger diameter than disc 10 is loosely mounted on the shaft between the knob and the rigid disc. The flexible disc is in close proximity to the other disc and the knob when the knob is in its inner position. Any kind of a flexible disc, the central portion of which will move in one direction when the outer edge is forced in the opposite direction, can be used. One suitable disc is formed by a ring of triangular stiff segments 13 encircling the shaft and having their apexes pointing toward the shaft. The outer portions of the segments are flexibly connected together in any suitable manner. They may be independent segments connected by separate flexible elements or, as shown, by reducing the thickness of the disc by providing it with radial grooves 14 at the outer ends of the slots between the segments.

With one disc disposed flat against the other, it will be seen that if the outer or flexible disc is pushed at one side of the shaft, it will tilt the rigid disc against the bushing in the same manner as described before, so the knob will be pushed outward. There is no particular advantage in using the flexible disc in that manner, but the flexible disc does have an advantage if it is desired to push against diametrically opposite marginal portions of it simultaneously with the thumb and forefinger. In such a case, as shown in Fig. 5, the disc is flexed inward over the outer edge of the stiff disc, thereby causing the central portion of the flexible disc (the inner points of segments 13) simultaneously to be forced outward against the knob to push the knob outward. This manner of using the flexible disc does not involve tilting the rigid disc.

It will be seen that a conventional push-pull snap switch can readily be converted into a push-push switch by merely mounting at least my rigid disc on the actuating shaft of the switch.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. The combination with a snap switch having a mounting bushing through which slidably extends an actuating shaft movable outward and inward to operate the switch, of a knob rigidly mounted on the outer end of the shaft for pushing the shaft inward in the bushing, and a stiff substantially flat disc loosely mounted on the shaft between the knob and bushing in close proximity thereto when the knob is in its inner position, the disc projecting radially beyond the knob in all directions to provide a marginal portion around the knob, the outer surface of said marginal portion being adapted to be engaged by a finger at any side of the shaft and pushed lengthwise of the shaft to tilt the disc against the adjoining end of the bushing and thereby cause the disc at the opposite side of the shaft to push the knob outward.

2. The combination with a snap switch having a mounting bushing through which slidably extends an actuating shaft movable outward and inward to operate the switch, of a knob rigidly mounted on the outer end of the shaft for pushing the shaft inward in the bushing, a stiff disc loosely mounted on the shaft between the knob and bushing in close proximity thereto when the knob is in its inner position, the disc projecting radially beyond the knob, and a flexible disc loosely mounted on the shaft between the knob and stiff disc in close proximity thereto when the knob is in said inner position, the flexible disc projecting radially beyond the stiff disc, the flexible disc around the knob being adapted to be pushed at any side of the shaft to tilt the stiff disc against the adjoining end of the bushing and thereby cause the stiff disc at the opposite side of the shaft to push the adjoining portion of the flexible disc outward against the knob to push the knob outward, and diametrically opposite marginal areas of the flexible disc being optionally pushable simultaneously to flex it inward over the outer edge of the stiff disc and thereby force the central portion of the flexible disc outward against the knob to push the knob outward.

3. In the combination of claim 2, said flexible disc being formed from a ring of triangular stiff segments pointing toward said shaft and having their outer portions flexibly connected together.

References Cited in the file of this patent

UNITED STATES PATENTS 1,570,315 Newhall ---------------- Jan. 9, 1926